(12) United States Patent
Bhogal et al.

(10) Patent No.: US 10,265,624 B2
(45) Date of Patent: *Apr. 23, 2019

(54) ACCESS CONTROL FOR ELECTRONIC ENTERTAINMENT SYSTEMS

(71) Applicant: INTERNATIONAL BUSINESS MACHINES CORPORATION, Armonk, NY (US)

(72) Inventors: Kulvir S. Bhogal, Fort Worth, TX (US); Gregory J. Boss, Saginaw, MI (US); Rick A. Hamilton, II, Charlottesville, VA (US); Andrew R. Jones, Round Rock, TX (US); Brian M. O'Connell, Carry, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,418

(22) Filed: Dec. 11, 2017

(65) Prior Publication Data

US 2018/0099223 A1  Apr. 12, 2018

Related U.S. Application Data

(63) Continuation of application No. 14/315,969, filed on Jun. 26, 2014, now Pat. No. 9,878,249, which is a (Continued)

(51) Int. Cl.
*G08B 1/08* (2006.01)
*A63F 13/75* (2014.01)
(Continued)

(52) U.S. Cl.
CPC ............ *A63F 13/75* (2014.09); *A63F 13/212* (2014.09); *A63F 13/79* (2014.09); *G08B 21/02* (2013.01);
(Continued)

(58) Field of Classification Search
CPC ............ A63B 71/0622; A63B 24/0059; A63B 24/0062; A63B 2024/0096; A63B 24/0075; A63F 13/212; A63F 2250/26
See application file for complete search history.

(56) References Cited

U.S. PATENT DOCUMENTS 5,362,069 A   11/1994  Hall-Tipping
6,409,603 B1   6/2002  Nishino et al.
(Continued)

OTHER PUBLICATIONS

"2010 FIFA World Cup Drinking Game" from Facebook, Apr. 2010.
(Continued)

*Primary Examiner* — James J Yang
*Assistant Examiner* — Kevin Lau
(74) *Attorney, Agent, or Firm* — Brian M. Restauro; Andrew M. Calderon; Roberts Mlotkowski Safran Cole & Calderon P.C.

(57) ABSTRACT

Systems and methods are provided for controlling the use of electronic systems based upon monitored physical activity. The method can be implemented in a computer infrastructure having computer executable code tangibly embodied on a computer readable storage medium having programming instructions. The program instructions are operable to: provision rules associated with a user and at least one of health metrics and physical activity of the user; monitor the at least one health metrics and physical activity of the user over a predetermined time; and manage access to any of a plurality of electronic systems based on the monitored at least one health metrics and physical activity being in compliance or non-compliance with the provisioned rules.

15 Claims, 4 Drawing Sheets

Related U.S. Application Data continuation of application No. 12/944,298, filed on Nov. 11, 2010, now Pat. No. 8,814,671.

(51) Int. Cl.
    *A63F 13/79*    (2014.01)
    *A63F 13/212*   (2014.01)
    *G08B 21/02*    (2006.01)
    *A63F 13/71*    (2014.01)

(52) U.S. Cl.
    CPC ....... *A63F 13/71* (2014.09); *A63F 2300/1012* (2013.01); *A63F 2300/201* (2013.01)

(56) References Cited

U.S. PATENT DOCUMENTS

| | | |
|---|---|---|
| 2006/0025282 A1 | 2/2006 | Redmann |
| 2006/0287080 A1 | 12/2006 | Bychkov |
| 2007/0111794 A1 | 5/2007 | Hogan et al. |
| 2007/0197274 A1 | 8/2007 | Dugan |
| 2008/0182724 A1 | 7/2008 | Guthrie |
| 2009/0029766 A1 | 1/2009 | Lutnick et al. |
| 2009/0042174 A1 | 2/2009 | Aries |
| 2009/0171788 A1 | 7/2009 | Tropper et al. |
| 2010/0048272 A1 | 2/2010 | Koh |
| 2010/0069148 A1 | 3/2010 | Cargill |
| 2010/0125028 A1 | 5/2010 | Heppert |
| 2011/0018682 A1 | 1/2011 | Weisfeld |
| 2011/0251021 A1 | 10/2011 | Zavadsky et al. |

OTHER PUBLICATIONS

Keating, "Limit your kids gadget", URL:http://blog.tmcnet.com/blog/tom-keating/gadgets/li mit-your-kids-video-game-play-time-with-this-gadget.asp Downloaded Nov. 2010, 5 pgs (Comments dating to Jul. 1, 2006).

SPREV, 11GameDr Video Game Timer limits kids1 gaming time'\ May, 3, 2009, URL: http://www.gizmag.com/gamedr-video-game-timer/1 1595/,5 pgs.

Wolf, "Practical Ways to Limit Screen Time", URL: http://singleparents. about.comfodfparentingfss/limItscreentime_3.htm, Downloaded Nov. 2010, 2 pgs. (date of authorship unknown), About.com, Copyright 2010.

Babycenter LLC, "How can llimit my child's video-game playing time?", URL: http://www. babycenter.com/404_how•can-i-limit-my-childs-video-game-playing-time_71157.be, 4 pgs, Copyrighted 1997-2010 by Babycenter LLC.

XBOX Support, "Online Safety and Privacy", URL: http://support.xbox.com/en-u slpages/xbox-livelhow-to/parental-control.aspx#tab-1-section3, Copyright 2010, Microsoft Corp,2 pgs.

ACCESS CONTROL FOR ELECTRONIC ENTERTAINMENT SYSTEMS

TECHNICAL FIELD

The present invention generally relates to systems and methods of controlling access to electronic systems and more particularly, to systems and methods of controlling the use of electronic entertainment systems based upon monitored physical activity.

BACKGROUND

The entertainment device industry, including video games, is an extremely high growth market. The technologies utilized by these systems is changing rapidly and input methods that were once limited to keystrokes, mouse movement, and joysticks now include innovations like gyroscopic controllers, motion sensors, and video cameras. In addition, not only are the systems and games improving, but the "intent" of some systems is expanding to include personal health management.

While game console providers and game developers are attempting to facilitate physical activity in their solutions, there are often ways to circumvent the physical aspect of playing these games. For example, with a gyroscopic motion sensing controller, using just a simple wrist flick can produce the same result as a full arm swing. Similarly, popular dance games can be played using a joystick rather than a dance pad. The intent of fitness related games is to motivate users to exert some level of physical activity.

SUMMARY

In a first aspect of the invention, a method is implemented in a computer infrastructure having computer executable code tangibly embodied on a computer readable storage medium having programming instructions. The program instructions are operable to: provision rules associated with a user and at least one of health metrics and physical activity of the user; monitor the at least one health metrics and physical activity of the user over a predetermined time; and manage access to any of a plurality of electronic systems based on the monitored at least one health metrics and physical activity being in compliance or non-compliance with the provisioned rules.

In another aspect of the invention, a system implemented in hardware comprises a monitoring module configured to monitor physical activity or health metrics of a user. The system further comprises a rules module configured to obtain rules from an administrator, which define users and access limits for the user on an electronic gaming system. The system further comprises an access module configured to obtain the monitored physical activity or health metrics of the user and the rules from the rules module and, based on the physical activity or health metrics of the user and compliance with the rules, manage access by the user to one or more electronic games played on the electronic gaming system.

In an additional aspect of the invention, a computer system for managing access to an electronic game is provided. The system a CPU, a computer readable memory and a computer readable storage media. The system further comprises first program instructions to obtain provisions from an administrator comprising one or more game provisions and user provisions. The system further comprises second program instructions to obtain start up information from a user wanting access to an electronic game. The system further comprises third program instructions to look up the one or more game provisions and user provisions that leads to access of the user to the electronic game by being in compliance with the one or more game provisions and user provisions. The system further comprises fourth program instructions to obtain monitored or sensed physical activity of the user in order to allow continued access of the user to the electronic game. The first, second, third and fourth program instructions are stored on the computer readable storage media for execution by the CPU via the computer readable memory.

In a further aspect of the invention, a method of deploying a system for managing access to an electronic entertainment system, comprises providing a computer infrastructure. The computer infrastructure is operable to: provision rules associated with a user and at least one of health metrics and physical activity of the user; monitor the at least one health metrics and physical activity of the user over a predetermined time; and manage access to any of a plurality of electronic systems based on the monitored at least one health metrics and physical activity being in compliance or non-compliance with the provisioned rules.

In still another aspect of the invention, a computer program product comprises a computer usable storage medium having readable program code embodied in the storage medium. The computer program product includes at least one component operable to: provide an initial amount of credits to a user in order to access an electronic game on a gaming system; match one or more game provisions and user provisions in order to manage access of the user to the electronic game by determining compliance with the one or more game provisions and user provisions; and obtain monitored or sensed physical activity of the user in order to allow continued access of the user to the electronic game.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
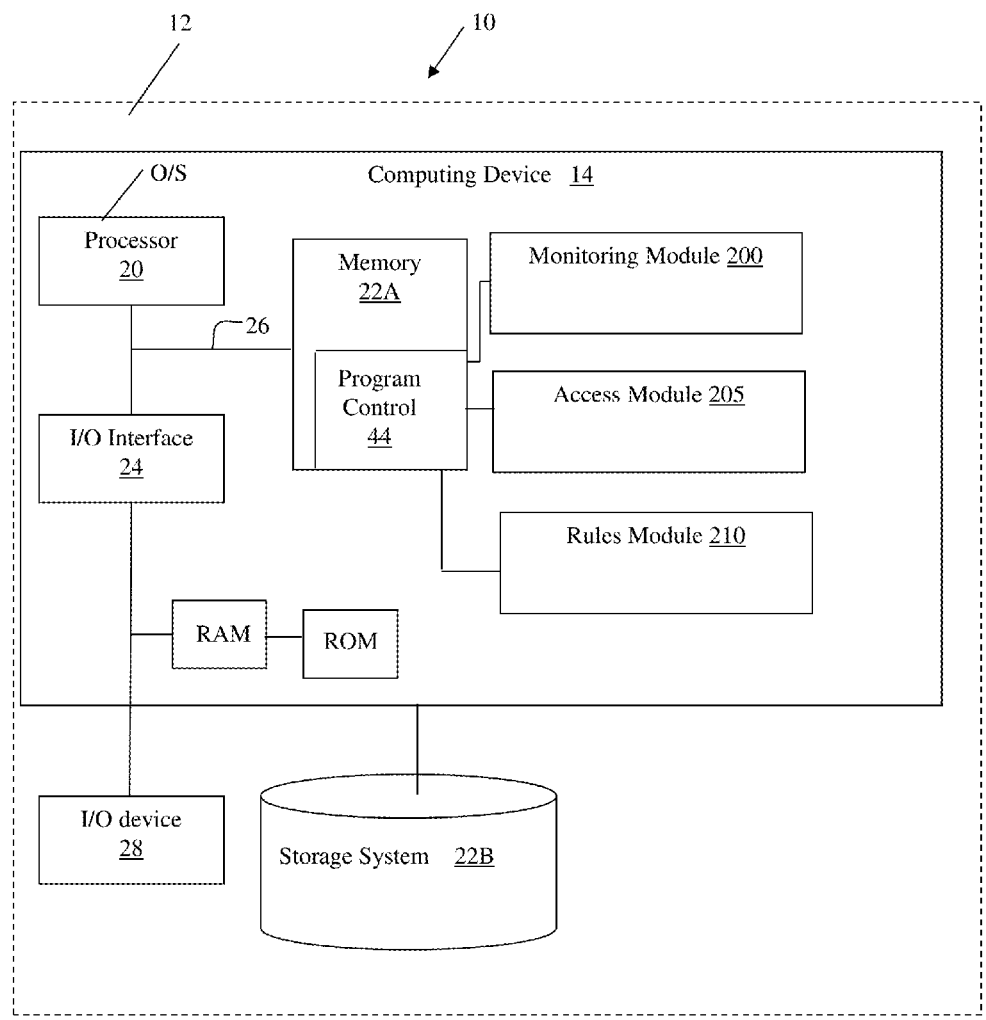
FIG. 1 is an illustrative environment for implementing the steps in accordance with aspects of the invention.

The present invention generally relates to systems and methods of managing and/or controlling access to electronic systems and more particularly, to systems and methods of managing and/or controlling the use of electronic entertainment systems based upon monitored physical activity. In more specific embodiments, the systems and methods allow administrators to monitor a user's physical activity and use such data (information) to manage access to electronic systems such as, for example, limiting the use of electronic games either over the Internet, on personal gaming consoles or on a personal computer or portable digital assistance such as, for example, a smart phone. Accordingly, it should be realized by those of skill in the art that the invention is not limiting to any type of gaming system and could be implemented on dedicated gaming systems, personal computer system, or even mobile devices and mobile gaming systems.

The methods and systems of the present invention can, in embodiments, monitor physical activity of the user during the actual use of an electronic game or other times such as, for example, when using exercise equipment (e.g., treadmill, stationary bicycle, stair stepper, weight machines, smart scales, logged time at a gym or exercise facility, or attendance at a school gym class, etc. (referred to generally as logged information)). This information can then be used to manage the time allotment a user may be allocated for using electronic games or access to other electronic systems. In this way, the methods and systems of the present invention promote physical activity of game users, for example, by controlling and/or limiting usage of a gaming device based on the physical activity (or lack thereof).

In embodiments, the methods and systems of the present invention can differentiate physical game play from non-physical game play using sensors and/or monitors such as, for example, caloric monitors, motion sensors, e.g., infrared analysis of in-room movement, as well as cameras that are designed to monitor the movement of the user during game play. The information related to physical game play and non-physical game can be used to control whether a user can continue to play the electronic game or use other electronic systems. This control can be used, e.g., to limit game play or other use of electronic systems between certain hours of the day, for a predetermined number of hours per day, a certain amount of time which offsets an amount of time associated with physical activity of the user, etc. The present invention can also monitor physical exertion as it relates to the actual game play such that, as a user exercises more, he/she is rewarded with enticements to continue the physical activity. These enticements may include, for example, access to games that do not require any physical exertion.

In embodiments, the methods and systems provide a quota system such that administrators (e.g., parents, self, trainers, service providers, etc.) can manage limits on playing time or use of electronic systems based upon physical activity. For example, credits can be earned by the user by participating in physical activity, and such credits can then be used to access gaming systems. In examples, the administrator and user relationship can include, for example: parent/child, teachers/students in education, medical advisors/patients in health care, etc.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for controlling and/or managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). The computing device can be, for example, a gaming console, a personal computer, a smart device such as, for example, a mobile smart phone or other electronic systems.

In embodiments, the computing device 14 and/or server 12 can be provided by a service provider, e.g., administrator, which can manage access to electronic systems, e.g., electronic games, in accordance with predefined rules. These predefined rules can be defined (provisioned) by the administrator, e.g., service provider or a third party that provides these rules to a service provider such as, for example, a parent, a teacher, a physical trainer, etc. These rules can also be obtained from a website or social networking site which allows users to rank, define and/or make rules for different situations, for example.

In exemplary embodiments, in use, administrators can define criteria (provisioning rules) for available play time per user or use of any electronic systems. By way of non-limiting example, these predefined rules may be entered into the systems of the present invention, provided to a social networking site for download, or provided to a service provider. The predefined rules can be generally any rules that allow or limit access to a specific electronic game based on, for example, fitness level and/or physical activity of the user, whether it be associated with the actual game play or other activities such as an exercise routine. These rules can generally be, e.g., a user can play a certain electronic game if: (i) the electronic game is registered, (ii) requires physical activity, and/or (iii) the user has exerted himself or herself through physical activity within a predetermined period of time, for a predetermined amount of time, in which case, the user can play an electronic game for the same predetermined amount of time. By way of more specific examples, the predefined rules may include:

(i) for every "X" minutes of exertion during game play, a user earns "X" type of points or credits for additional game play;
(ii) for every "X" minutes of any physical activity, a user can have an equal amount of time playing or other predefined amount of time to interact with an electronic game on a gaming console, smart device or over the Internet using a computing device;
(iii) for every "X" minutes of game play or other use of electronic systems, the user will be deducted "X" amount of time for access to the game play;
(iv) a user who is of a certain age and has a % body fat measurement below Y % can play predefined games for predefined periods of time;
(v) allow a user to play non-exertive game play as long as the user's health measurements are maintained below (or above) a certain threshold;
(vi) do not allow game play when the user's fitness level does not meet a certain threshold, or they user has not had any monitored physical activity within a predetermined timer period; and/or
(vii) allow continued use of an electronic game by the user when the physical activity monitored during game play is above a threshold amount.

In embodiments, the physical exertion can be measured in terms of calories burned, time spent exerted oneself on the game play or other activity, type of exertion, quality of exertion, or accomplishments, or any combination of the above measurements.

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard, gaming controller, etc.

In general, the processor 20 executes computer program code (e.g., program control 44), which can be stored in the memory 22A and/or storage system 22B. Moreover, in accordance with aspects of the invention, the program control 44 controls a monitoring module 200, an access module 205 and a rules module 210, e.g., the processes described herein. The monitoring module 200, access module 205 and rules module 210 can be implemented as one or more program code in the program control 44 stored in memory 22A as separate or combined modules. Additionally, the monitoring module 200, access module 205 and rules module 210 may be implemented as separate dedicated processors or a single or several processors to provide the function of these tools.

In embodiments, the monitoring module 200 is configured to monitor the physical activity of a user. The monitored activity can be obtained by many different methods and combinations thereof. For example, the physical activity of the user can be obtained by many different types of sensors or monitors such as, for example, motion sensors, heart rate monitors, caloric monitors, scales, game controllers (e.g., gaming pads) or other biometric sensors and/or monitors that can monitor or obtain, for example, physical exertion, weight, body fat, bone density, perspiration, and so forth. The physical activity can also be obtained by other methods such as, for example, monitoring of an odometer or speedometer of, for example, treadmill or stationary or non-stationary bicycle, stepping devices, weight machines or other exercise equipment, or smart scales, logged time at a gym or exercise facility, or attendance at a gym or exercise class, etc.

The information obtained from the different types of sensors or monitors or other methods discussed herein and/or known to those of ordinary skill can be provided to the monitoring module 200 by wireless or other communication mechanisms as described herein. In further embodiments, the monitoring module 200 can be part of the gaming console, itself, and the measured activity can be provided by the gaming devices of the gaming console, e.g., movement of the joystick, game controllers, etc. Alternatively or in addition, the monitoring module 200 can be provided on another computing device (also representative of FIG. 1), and the information provided to the monitoring module 200 by the e.g., movement of the joystick, game controllers, etc.

The access module 205 can use the information obtained from the monitoring module 200 and, using the predefined rules defined in or obtained by the rules module 210, allow access to electronic systems such as, for example, an electronic game. More specifically, in embodiments, the access module 205 will use the predefined rules stored in the rules module 210 (or storage system 22B) to allow a user to play or limit play, for example, of an electronic game. For example, the access module 205 manages access to any of a plurality of electronic systems based on the monitored fitness level and/or physical activity being in compliance or non-compliance with the provisioned rules. By way of non-limiting examples, depending on the predefined rules, the access module 205 can:

(i) allow access to certain electronic games;
(ii) deny access to certain electronic games;
(iii) deny access to all electronic games; and/or
(iv) allow a user to play an electronic game based on credits obtained or earned, etc.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Exemplary System

Figure 2:
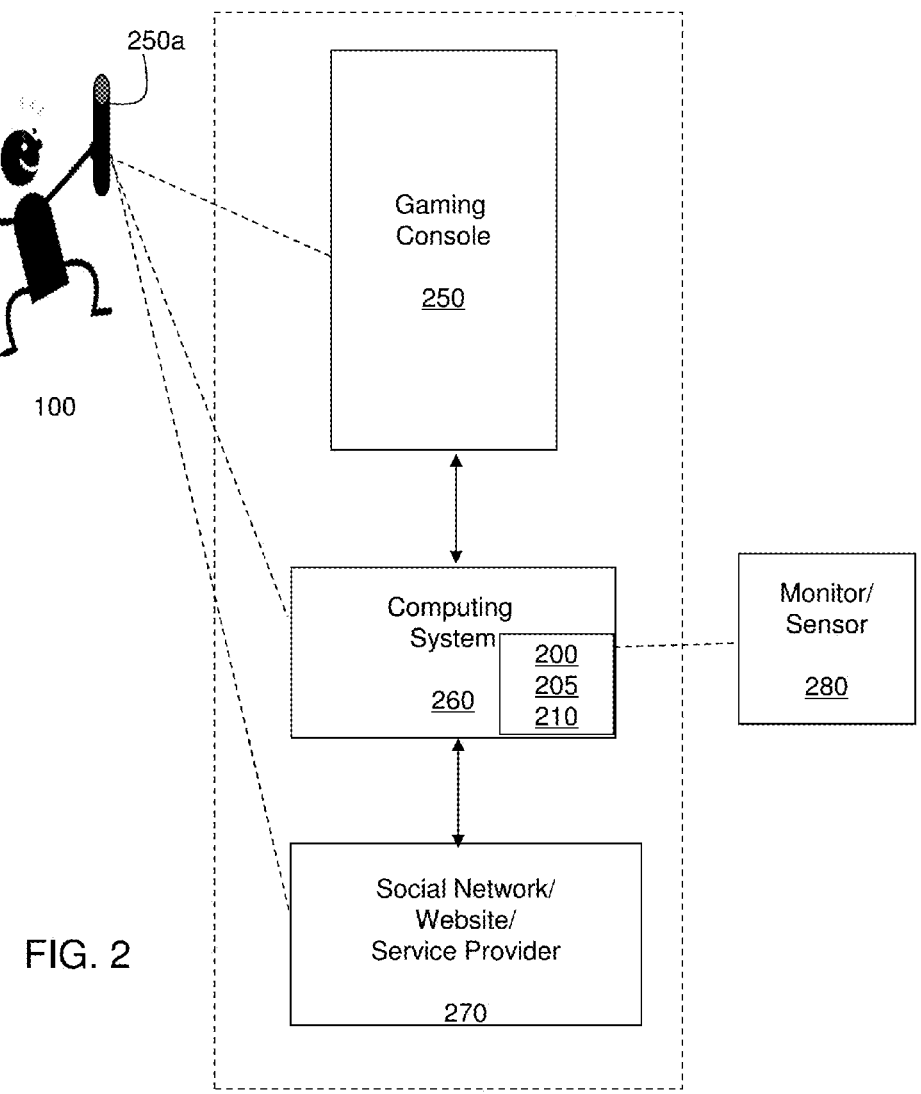
FIG. 2 shows a system implementing processes in accordance with aspects of the present invention.

FIG. 2 shows an exemplary system implementing aspects of the present invention. More specifically, FIG. 2 shows a user 100 interacting with a gaming console 250. In embodiments, the gaming console 250 can be representative of the computing infrastructure of FIG. 1. The gaming console 250 can also be, for example, a standalone gaming console, a personal computing device or a smart phone or other mobile device that is capable of playing electronic games. In embodiments, the gaming console 250 includes a gaming controller 250a, which is representative of a joystick or other controlling device (e.g., gaming pad, chair, racket, etc.).

The system of FIG. 2 further shows a computing system 260, which can be representative of a computing device of a service provider or other administrator. In embodiments, the computing system 260 can also be representative of the computing infrastructure of FIG. 1. In embodiments, the computing system 260 can include the modules 200, 205 and 210, as discussed above, and can be part of or separate from the gaming console 250. The computing system 260 may be connected to the gaming console 250 and/or directly to the gaming controller 250a through any type of network, including a local area network (LAN) or a wide area network (WAN), or the connection may be made through the Internet using an Internet Service Provider).

In addition, a website, social networking site and/or third party service provider, all of which are represented as a computing system 270, is connected to the computing system 260. The computing system 270 may be connected to the computing system 260, gaming console 250 and/or directly to the gaming controller 250a through any type of network, including a local area network (LAN) or a wide area network (WAN), or the connection may be made through the Internet using an Internet Service Provider. It should be understood that each of the gaming console 250, computing system 260 and website, social networking site and/or third party service provider 270 (computing system 270), may reside on a single computing device (represented as the surrounding dashed lines) or may be separate components or any combination thereof. In embodiments, the computing system 270 may provide default rules (provisions) to the rules module 210.

One or more monitors and/or sensors 280 may also be connected to the computing system 270, computing system 260, gaming console 250 and/or the gaming controller 250a through any type of network, including a local area network (LAN) or a wide area network (WAN), or the connection may be made through the Internet using an Internet Service Provider. The one or more monitors, as discussed above, may be any biometric sensor/monitor, as well as other devices that can monitor physical activity such as, for example, an odometer or speedometer, to name a couple. The information obtained from the monitors and/or sensors 280 can be provided to the computing system 260 and, more specifically, any combination of the modules 200, 205, 210, to be used with the rules in order to determine and/or manage access to an electronic system, e.g., electronic game.

In use, any physical activity of the user 100 may be transmitted to the computing system 260. This transmission may be a direct transmission or through the gaming console 250, for example. The physical activity can be associated with current activity associated with a game being played, physical activity of a previous game or physical activity not associated with any electronic game. In the latter scenario, the physical activity can be associated with previous exercise or other physical activity. In additional embodiments, the biometric information of a user can be provided to the computing system 260 (e.g., monitoring module 200) either directly or through the gaming console 250. This biometric activity may be, for example, age of the user, weight of the user, percentage of body fat, as well as any other criteria that can be used to gauge the health of the user such as, for example, standing heart rate, oxygen saturation, etc.

Predefined rules can be provided to the computing system 260 (e.g., rules module 210) either directly or through the gaming console 250 or computing system 270. In embodiments, these rules can be used to control access to the gaming console 250. The predefined rules can be, for example, provided by any administrator, including a service provider. In the case of using a social networking site, for example, default rules can be selected by the administrator. For example, in embodiments, the administrator would select one or more default rules that were provided from a third party, that matches the required or desired rules of the administrator. In embodiments, the present invention contemplates that many different rules can be mixed and matched for a desired outcome, depending on a particular circumstance. The default rules can also be configurable (e.g., changed or modified) by the administrator and provided to the rules module 210, or uploaded into the social network or to a service provider, for example.

In embodiments, based on the biometric information and the rules, the access module 205 can provide access to the gaming console 250. More specifically, in embodiments, the access module 205 can, for example, review the biometric information and match the biometric information to the rules. If there are matches, the access module 205 can then provide some limited access to the gaming console 250, in accordance with the rules. If there are no matches, or based on the biometric information received, the access module 205 can deny access to the gaming console or any particular game played on the gaming console 250. For example, in the latter scenario, the gaming console 250 can automatically register with the access module 205 which game is currently loaded into the gaming console (or, in the case of a personal computer or smart phone or other mobile device, which game is currently on the device or being downloaded onto the device.) The computing systems 260, 270 and/or 280 can determine which electronic games provide physical activity and which games do not require physical activity.

Flow Diagram

Figure 3:
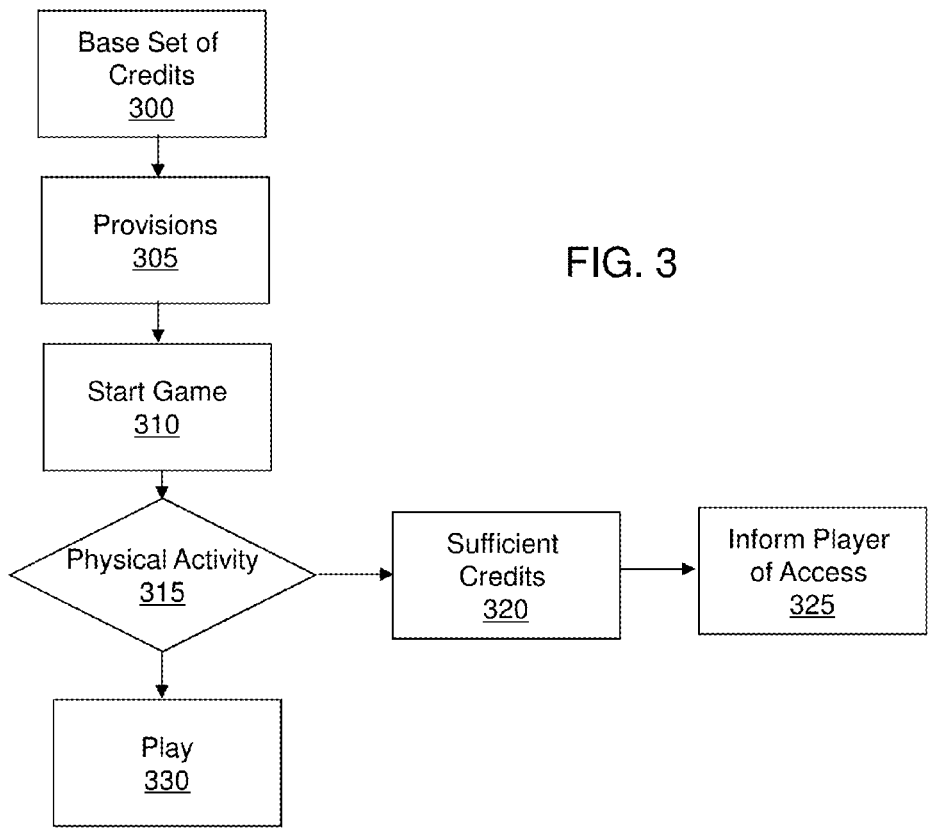
FIGS. 3 and 4 show exemplary flows implementing processes in accordance with aspects of the invention.
Figure 4:
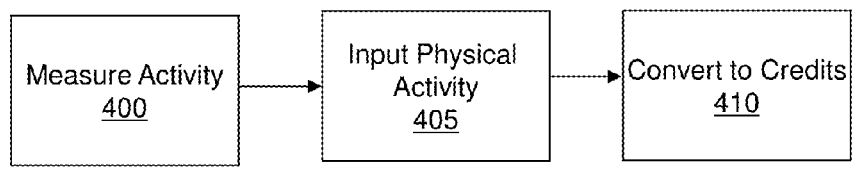
Figure 5:
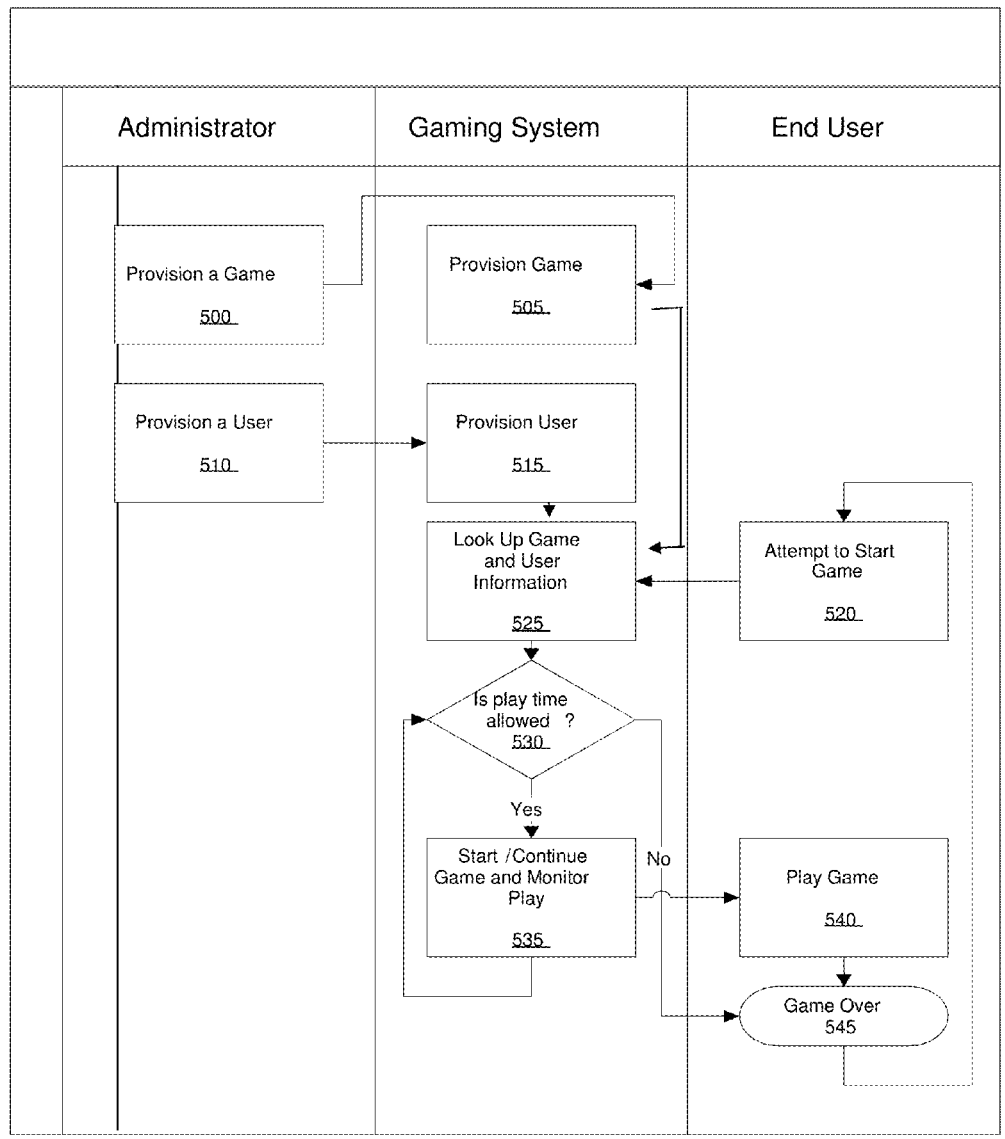
FIG. 5 shows an exemplary swim lane diagram implementing processes in accordance with aspects of the present invention.

FIGS. 3-5 show exemplary flows for performing aspects of the present invention. The steps of FIGS. 3-5 may be implemented in the environment of FIG. 1, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

FIG. 3 depicts an exemplary flow for a process in accordance with aspects of the present invention. At step 300, some base set of credits are allotted to allow initial play time on an electronic device. At step 305, administrative provisions, e.g., rules, can also be provided by an administrator. The administrative provisions, in addition to those noted above, can include a set of electronic games that are known to require physical activity and non-physical activity. At step 310, a user inserts/starts an electronic game. At step 315, the program control determines the type of electronic game, e.g., validates the electronic game as an "approved" game via rules of step 305 (e.g. requires physical activity or does not require physical activity).

If the game does not require physical activity, at step 320, the program control determines if sufficient credits exist to play an electronic game. At step 325, the program control can inform the user of amount of time left, new levels obtained, etc. based on available credits. If, at step 320, the program control determines that the game does require physical activity, then the process proceeds to step 330. At step 330, the user can be permitted to play the game involving physical activity.

FIG. 4 shows additional processes in accordance with aspects of the invention. At step 400, the gaming system or other computing system noted above, measures physical activity of the user via methods such as but not limited to: video analysis of in-room movement, infrared analysis of in-room movement, bio-metric feedback systems such as inclusion of heart rate monitor in handheld unit or other related device, detection of perspiration by handheld unit or other related device, etc. At step 405, the gaming system or other computing system inputs physical activity to the system of the present invention. At step 410, the program control converts the input into points/credits (e.g., time that can be used to play electronic games, depending on whether physical or non-physical activity is required) that are awarded to the user's account. These points and/or credits can then be transferred for additional playing time on the same game, a different game, etc.

For example, for burning "X" amount of calories, or running a certain distance, or being active for "X" amount of time, the program control can allocate one or more credits, which are redeemable for more playing time on the same or different electronic game, new levels of a game, etc., regardless of whether the electronic game requires physical activity, for example. It should be understood, as discussed above, that the measurement of physical activity may be associated with non-gaming systems, and applied to the gaming system paradigm. By way of illustrative example, the gaming system can receive information from a treadmill that shows a user logged in and ran two miles, burned 400 calories, etc. Doing so could then allow exertion accomplished outside of the gaming system, itself, to be transferred to credit within the desired entertainment system.

FIG. 5 shows a swim lane diagram implementing processes in accordance with aspects of the present invention. The swim lane diagram includes the following actors: an administrator, a gaming system and end user (e.g., gamer). For illustrative purposes, the description below is described with reference to a dedicated gaming console as the gaming system, but as described previously, the processes of the present invention can also be implemented on a personal computer, mobile device, etc. In embodiments, the administrator can be a parent that purchased the gaming system or requested the services related to the processes of the present invention.

At step 500, the administrator provisions the game and/or gaming system. The provisioning may be provided through an initialization phase that configures the system, secures the administration of the quota system with a password, and prompts for one or more games that can be allowed. In embodiments, the provisions can be provided at any time, and entered directly into the game system or provided to a service provider, via the game system or another computing device, which will manage the access to any of the games noted in the provisioning step. Also, as discussed above, the provisions can be uploaded from a website or social networking site, for example, at the time of initialization or other time. This process can be reactivated by the administrator to add new users, add credits, and change rates or other variables (rules).

In embodiments, the provisions can be rules, which are implemented by the processes of the present invention. For example, these rules may be used to allow or limit access to the electronic game, and may include, for example, the types of games allowed to be used, when they can be used, how long they can be used, etc., depending on many factors such as, for example, whether physical activity is required, how many credits are available to the user based on previous activities, etc. At step 505, the gaming system saves the provisions for future retrieval and application.

At step 510, the administrator provisions a user or set of users that are allowed to use the system along with specific information about those users such as, for example, quotas for playing time (e.g., open levels, exceeded thresholds, credits, etc.). This provisioning may include defining a user "id" and password or some other method that end users will use to identify themselves to the gaming system. This process can be reactivated by the administrator to add new users, add credits, and change rates or other variables. At step 515, the gaming system saves the provisions for later retrieval and application.

The data input into the system at either steps 500 or 510 may include any combination of the rules described herein, but is not limited to, such information as:

(i) initial amount of allowed playing time/credits;
(ii) crediting rate for a detectable amount of physical activity (e.g., for every 5 minutes of activity, add 5 credits); and/or
(iii) debit rate of playing time (e.g. for every 5 minutes of play, reduce available credits by 1) Note, playing time may not reflect any physical activity, so it is possible for user to "play" the game, but earn no credits as no physical activity is exerted.

At step 520, an end user starts the game or gaming system. At step 520, the game or game system can be augmented such that if the system detects a game has been inserted/started that has not been provisioned by the administrator, an option appears that allows for provisioning of the game provided the end user enters the correct id/password. This would provide protection against an end user moving an assigned "file" or downloading an "account" to another user's system which does not have the console parameters configured (access authorization). The ability to restart this process may also be invoked through some other key sequence or option via the gaming system. The system can also be implemented at the game or account level rather than at the console level.

In embodiments, the program control can monitor and/or use health metric thresholds to determine access to game play. For example, these health metrics can be percent body fat, weight, age, bone density, etc., any of which can be used by the program control to determine whether the user can begin or continue game play, using one or more different games. For example, at step 520, the gaming system will validate who the user is (e.g., through a login type system or some biometric identification system) and then determine whether the user is in the system, e.g., using a look up table in the storage system 22B of FIG. 1, and meets the criteria to play the requested game. If these criteria are met, e.g., body fat, weight, age, bone density, etc., are within acceptable limits, the program control will continue to step 540, where the user can begin to play. In this way, it is possible to manage access to any of a plurality of electronic systems (e.g., games) based on the monitored fitness level and/or physical activity being in compliance or non-compliance with the provisioned rules.

At step 525, the game system (e.g., program control) looks up the game and user provisions. For example, step 525 involves matching rules (as provisioned by the administrator) to the user, that ultimately leads to the decision at step 530, e.g., is the user allowed to play the electronic game. The matching, e.g., logic, can include, but is not limited to the analysis of and of the rules noted herein, in addition to or in combination with any of the information described below, such as:

(i) Is the game in the quota system?;
(ii) What is the exertion rate of this game?;
(iii) Is the user in the quota system?;
(iv) What is the user's current credit count?; and/or
(v) Does the user have enough credits to start playing the game?

The system may optionally connect to other registered health or exertion related devices including but not limited to treadmills, stepping devices, weight machines, smart scales, logged time at a gym or exercise facility, or attendance at a school gym class, etc.

If the answer to step 530 is negative, e.g., does not match any of the rules or combination of rules as provisioned by the administrator, the user is not allowed to play the game or is only allowed limited access to a game, e.g., play only portions of the game that require physical activity. This may include the presentation of some descriptive message stating why and may allow for an administrative action (provided password is provided) to allow the game, update users credits, etc.

If it is determined at step 530 that the rules or combination of rules as provisioned by the administrator are met, the process continues to step 535. At step 535, the game system will start game play and continue to monitor the game activity. The process can revert back to step 530 at predetermined times, e.g., every minute, five minutes, etc., to determine whether the rules are still met and that the user can continue playing the game. If the rules (or any predetermined combination thereof) are not met, the process ends (e.g., game ends) at step 545. Otherwise, at step 545, the user can begin or continue play of the electronic game.

At step 535, the gaming system monitors, for example, the credit/debit rate of the game, e.g., whether the user has enough credits to continue playing, and the physical activity of the user. Here, the gaming system debits the end users' credits for each predefined amount of game play time (e.g., 1 credit for every 5 minutes) as defined by the administrators input in the system. In addition, the gaming system monitors the physical activity using one or more input devices available to the system. These may include in any combination with the devices described herein, but are not limited to:
(i) video camera(s);
(ii) game pads (e.g. exercise mats with sensors, exercise steps with sensors, etc.);
(iii) game chairs;
(iv) game controllers; and/or
(v) other devices that can measure some form of use and exertion of effort by the user (e.g. a controller built into a tennis racquet, skate board with sensors, etc).

Input from these devices is analyzed by the gaming system and an exertion rate can be calculated. These calculations may be solely based upon input data of the administrator, built into the system, measured by the actual input devices themselves, or from some other source (e.g., configuration data, dynamic data acquired over the Internet, data input by an observer, etc). This analysis is used to credit the end user with a certain amount of credits based upon his/her physical exertion. In addition, the program control at step 540, acts as a monitor and can perform an analysis as described for at step 525. In short, that is, if the user during game play exhausts his/her available credits, the system may end the game play.

Accordingly, in this way, the systems and methods of the present invention provide new management methods, implemented in hardware and software, for gaming systems. These techniques allow additional controls and incentives to be placed around certain activities, so that normally sedate activities can be predicated on other, more health-promoting actions for the user.

In additional embodiments, the gaming system can be integrated with a peer-to-peer or crowd source system, e.g., social network, which allows for checking of how "physical" a game might be, how much different types of detectable exertions should be "worth", e.g., credits, etc. For mobile gaming systems, the system may be implemented and accessed on some remote server such as that shown in FIG. 1. This server may be configured when the device is initially provisioned, when a game is added, etc., as already discussed herein. In some embodiments, the systems and methods may automatically adjust thresholds to assist in weight management. For example, if the system is providing "X" activity credits for non-active game play and the user is gaining weight, those credits may be reduce to require the user to be more active to gain additional non-active credits. This may be tracked by a scale, for example, that is connected to the systems of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:
1. A method implemented in a computer infrastructure having program code stored on a computer readable hardware storage device, the program comprising:
program code to provision rules associated with a user and at least one of health metrics and physical activity of the user;
program code to monitor the at least one of the health metrics and the physical activity of the user over a predetermined period of time;
program code to determine that the user can access one of a plurality of electronic systems for additional time based on the user achieving a threshold level associated with the provision rules of the at least one of the health metrics and the physical activity of the user; and program instructions to augment a game system, when the game system detects that an electronic game has been inserted or started and has not been provisioned, by providing an option that allows for provisioning of the electronic game provided the user enters a correct id and password, wherein the monitoring the at least one of the health metrics and the physical activity includes monitoring by a caloric monitor to track calories burned, a motion sensor and a camera to track a movement of the user, a heart rate monitor to track a heart rate of the user, and a biometric sensor to track a physical exertion of the user.

2. The method of claim 1, further comprising program instructions to monitor the at least one of the health metrics and the physical activity of the user over a predetermined time, wherein the monitoring of the physical activity comprises monitoring the physical activity of the user during use of the electronic game of the plurality of electronic systems.

3. The method of claim 2, wherein the monitoring of the physical activity is measured in terms of time spent exerting oneself on game play or other activity, type of exertion, and quality of exertion.

4. The method of claim 3, wherein the physical activity is monitored when the user is at least one of: using exercise equipment; logged time at a gym or exercise facility or attendance at an exercise class, and information about the physical activity is sent to the electronic game and is converted to credits for use in accessing and playing the electronic game of the plurality of electronic systems.

5. The method of claim 2, wherein the monitoring of the physical activity is monitored by at least one of sensors and monitors during game play of the electronic game of the plurality of electronic systems, the monitored physical activity is provided to a computing system which allows continued use of the electronic game by the user when the physical activity is above the threshold level, wherein the threshold level is associated with a percentage body fat measurement.

6. The method of claim 1, wherein the provisioning of the rules comprises allowing the user to participate in electronic games that require physical activity.

7. The method of claim 1, further comprising managing access of the user, wherein the managing access comprises:

crediting an account of the user with credits to use any of the plurality of electronic systems based on the at least one of the health metrics and the physical activity of the user, wherein the credits are used to play a different electronic game on any of the plurality of electronic systems; and debiting the account of the user over time to limit access to the any of the plurality of electronic systems.

8. The method of claim 7, wherein the managing access is provided by a computing system that determines which games are provisioned.

9. The method of claim 7, wherein the managing access further comprises reducing the credits in response to the user gaining weight.

10. The method of claim 7, wherein the managing access further comprises adding the credits in response to the user exercising on an external device.

11. The method of claim 1, further comprising program instructions to deny the user access to the electronic systems when the game system detects that the electronic game has been started.

12. The method of claim 11, wherein the denying the user access occurs when the user does not achieve the threshold level associated with the provision rules.

13. The method of claim 1, further comprising distinguishing between electronic games that require physical activity and non-physical activity, and allowing one of: the user to play the electronic games that require physical activity and providing credits for physical game play.

14. The method of claim 1, wherein the provisioning of the rules is provided by an administrator to manage limits on playing time or use of electronic systems based upon physical activity.

15. The method of claim 1, wherein the provisioning of the rules is obtained from a social networking site.

* * * * *